United States Patent [19]

Iehisa et al.

[11] Patent Number: 5,084,885
[45] Date of Patent: Jan. 28, 1992

[54] NC LASER DEVICE

[75] Inventors: Nobuaki Iehisa, Minamitsuru; Etsuo Yamazaki, Hachioji, both of Japan

[73] Assignee: Fanuc Ltd., Minamitsuru, Japan

[21] Appl. No.: 465,267

[22] PCT Filed: Jul. 26, 1989

[86] PCT No.: PCT/JP89/00773
§ 371 Date: Mar. 30, 1990
§ 102(e) Date: Mar. 30, 1990

[87] PCT Pub. No.: WO90/01819
PCT Pub. Date: Feb. 22, 1990

[30] Foreign Application Priority Data

Aug. 3, 1988 [JP] Japan .................... 63-193684

[51] Int. Cl.$^5$ .................................... H01S 3/04
[52] U.S. Cl. ........................ 372/34; 372/38; 372/33; 372/58
[58] Field of Search ............... 372/34, 33, 58, 38, 372/55

[56] References Cited

U.S. PATENT DOCUMENTS

| | | | |
|---|---|---|---|
| 4,692,924 | 9/1987 | Koizumi et al. | 372/38 |
| 4,697,269 | 9/1987 | Ohara | 372/34 |
| 4,935,937 | 6/1990 | Yamazaki et al. | 372/58 |

Primary Examiner—Leon Scott, Jr.
Attorney, Agent, or Firm—Staas & Halsey

[57] ABSTRACT

An NC laser device is provided which is a combination of a gas laser oscillator having a cooling mechanism for forcibly cooling a laser gas by a blower and a cooling unit, and a numerical control device. The NC laser device includes a gas temperature measuring device for measuring a gas temperature at an inlet of the blower, a casing temperature measuring device for measuring a temperature of a casing of the blower, and an abnormality detecting device, etc. The abnormality detecting device detects an abnormal state of the cooling mechanism, and stops the operation of the gas laser oscillator, when the inlet gas temperature or the casing temperature becomes higher than the respective reference value. Accordingly, an abnormal state of the cooling mechanism can be detected at an early stage, and thus secondary damage to the blower can be prevented.

9 Claims, 1 Drawing Sheet

NC LASER DEVICE

BACKGROUND OF THE INVENTION

Technical Field

The present invention relates to an NC laser device provided with a mechanism for forcibly cooling a laser gas by a blower and a cooling unit, and more particularly, to an NC laser device able to detect abnormalities in a cooling mechanism.

BACKGROUND ART

Gas laser oscillators such as a $CO_2$ gas laser are highly efficient and have a high-power output and excellent beam characteristics, and accordingly, are widely used in combination with a numerical control device to thereby act as an NC laser device for machining metals, etc. To improve the oscillation efficiency, these types of gas laser oscillators are provided with a cooling mechanism for externally cooling a high-temperature gas heated by laser oscillation, and returning the cooled gas as the laser gas into a discharge tube. The cooling mechanism includes a cooling unit, a blower, and a blower piping connecting these elements to the discharge tube; the blower causing a constant circulation of the laser gas within the discharge tube.

In this cooling mechanism, if the inherent function of the cooling unit is lost, the blower is subjected to a direct flow of the high-temperature gas, and thus the rotors of the blower are overheated to an abnormal level. Even if the cooling unit is operating properly, the rotors can be overheated due to an abnormal increase in the number of rotations of the blower. For example, if a blower originally designed for use at 50 Hz is erroneously used at 60 Hz, the number of rotations thereof is increased, and accordingly, the compression ratio of gas in the vicinity of the rotors is increased and the rotors are overheated.

Namely, various causes of an abnormal heating of the rotors of the blower exist, and if an abnormal heating of the blower rotors eventually occurs due to any one of these causes, the rotors are thermally expanded and come into contact with the casing, whereby the number of rotations thereof is reduced until, finally, a state is reached in which the rotors cannot rotate.

In this case, even if the number of rotations of the blower is monitored, the rotors will come into contact with the casing before a reduction in the number of rotations is observed, resulting in a scattering of the materials forming these elements within the blower system, and an inevitable contamination of the laser oscillator. The gap between the rotor and the casing is 100 to 300 $\mu$m in the case of a Roots blower and is as small as 30 to 50 $\mu$m in the case of a turbo-blower. The rotors and the casing are made of iron, which has a coefficient of thermal expansion of $10 \times 10^{-6}/°C.$, and therefore, if the rotors are heated to a level such that the difference in temperature between the rotors and the casing is several tens of °C., contact between the rotors and the casing is unavoidable.

SUMMARY OF THE INVENTION

The present invention was created in view of the above circumstances, and an object thereof is to provide an NC laser device in which an abnormality in a cooling mechanism is detected at an early stage by monitoring an inlet gas temperature and a casing temperature of a blower, whereby secondary damage to the blower, etc., can be prevented.

To solve the aforementioned problems, the present invention provides an NC laser device which is a combination of a gas laser oscillator provided with a cooling mechanism for forcibly cooling a laser gas by a blower and a cooling unit, a numerical control device (CNC), a gas temperature measuring means for measuring a gas temperature at an inlet of the blower, a casing temperature measuring means for measuring a temperature of a casing of the blower, and an abnormality detecting means for detecting an abnormal state of the cooling mechanism, and stopping an operation of the gas laser oscillator, when the inlet gas temperature becomes higher than a predetermined gas temperature reference value or when the casing temperature becomes higher than a predetermined casing temperature reference value.

The inlet gas temperature and the casing temperature of the blower are measured and compared with their respective reference values, and when either of the measured temperatures becomes higher than the related reference value, the operation of the laser oscillator is immediately stopped, and simultaneously, an alarm is displayed at a display device.

DESCRIPTION OF THE PREFERRED EMBODIMENTS

Figure 1:
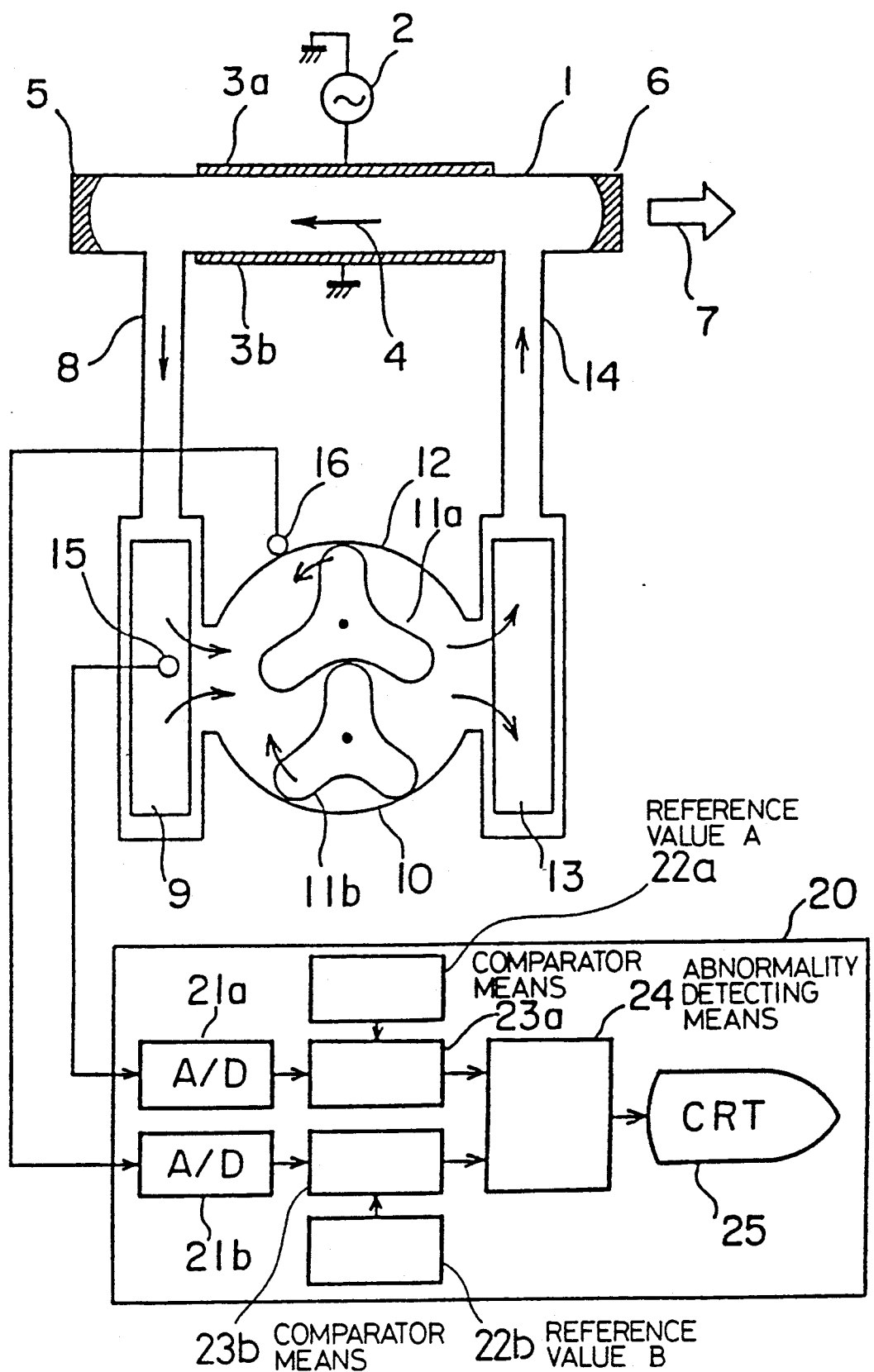
FIG. 1 is a diagram showing an arrangement of an NC laser device according to one embodiment of the present invention.

Now, an embodiments of the present invention will be described with reference to the drawing.

FIG. 1 is a diagram showing an arrangement of an NC laser device according to the embodiment of the invention, wherein 1 denotes a discharge tube; 2 denotes a power supply for the laser; and 3a and 3b denote metal electrodes. A high-frequency electric power is supplied from the laser power supply 2 to a laser gas 4 passing through the inside of the discharge tube at a high speed, through the metal electrodes 3a and 3b, and accordingly, an electric discharge occurs in the laser gas flow 4 and the laser gas is pumped, whereby a laser beam is output by an induced emission. Numeral 5 denotes a total reflection mirror for reflecting the laser beam; and 6 denotes an output coupling mirror. The laser beam is reciprocated between the total reflection mirror 5 and the output coupling mirror 6, is amplified, and a part 7 thereof is output to the outside through the output coupling mirror 6.

The laser gas 4, which is heated by the laser oscillation, flows to a cooling unit 9 through blower piping 8 and is cooled. Numeral 10 denotes a blower which, in this embodiment, is a Roots blower; 11a and 11b denote rotors; and 12 denotes a casing. The laser gas 4 is compressed by the blower 10, as indicated by the arrows in the figure, and forced out into a cooling unit 13, where the heat produced by compression is removed by the unit 13, and flows back into the discharge tube 1 through a blower piping 14. Numerals 15 and 16 denote thermocouples for measuring the gas temperature at an inlet of the blower 10 and the temperature of the casing 12 of the blower 10, respectively. The measured temperature values are converted into voltages and output to a numerical control device.

Numeral 20 denotes the numerical control device, for which a numerical control device (CNC) for controlling the gas laser is used; 21a and 21b denote A/D converters for converting the analog voltages from the thermocouples 15 and 16 into digital values, respectively; 22a denotes a reference value A which is a digital value set to be equivalent to an upper limit of 40° C. for the inlet gas temperature of the blower 10 during normal operation, as mentioned later; 22b denotes a reference value B, which is a digital value equivalent to an upper limit of 70° C. as the temperature of the casing 12 during normal operation; and 23a and 23b denote comparator means. The comparator means 23a compares the output of the A/D converter 21a with the reference value A 22a, and when the former is greater than the latter, outputs a signal to an abnormality detecting means. Similarly, the comparator means 23b compares the output of the A/D converter 21b with the reference value B 22b, and when the former is greater than the latter, outputs a signal to the abnormality detecting means. Numeral 24 denotes the abnormality detecting means, which stops the operation of the laser oscillator when receiving a signal from the comparator means 23a and 23b, and displays an abnormality message corresponding to the state of the input signal at a display device 25, such as a cathode ray tube (CRT). The numerical control device 20 further comprises a position control circuit for controlling the position of a workpiece, and a memory for storing a machining program and parameters, etc., but these elements are omitted from the drawing.

With regard to the gas temperature and the temperature of the casing 12, etc., the temperature of the gas after passing through the discharge tube 1 is about 250° C., and the inlet gas temperature of the blower 10 does not exceed 40° C. during normal operation. Also, the temperature of the casing 12 does not become higher than 70° C. during normal operation. The gas temperature at the outlet of the blower 10 is about 60° C., and the gas is cooled to approximately room temperature at the inlet of the discharge tube 1.

If, however, the cooling unit 9 or 13 is damaged or the number of rotations of the rotors 11a and 11b is reduced, the inlet gas temperature of the blower 10 rises and thus the output of the A/D converter 21a becomes higher than the reference value A 22a. Accordingly, the comparator means 23a outputs a signal to the abnormality detecting means 24. Upon receiving the signal from the comparator means 23a, the abnormality detecting means 24 issues a command to promptly stop the laser oscillator, regardless of whether or not the other comparator means 23b has output a signal, and simultaneously, displays a message indicating the abnormality of the cooling mechanism at the display device 25.

If the number of rotations of the rotors 11a and 11b rises to an abnormal level, the temperature of the casing 12 is increased due to heat produced by compression, even when the inlet gas temperature of the blower 10 is normal In this case, the output of the A/D converter 21a remains lower than the reference value A 22a and only the output of the A/D converter 21b rises above the reference value B 22b, and accordingly, the comparator means 23b alone outputs a signal to the abnormality detecting means 24. Accordingly, the abnormality detecting means 24 issues a command to immediately stop the operation of the laser oscillator, and displays a message at the display device 25 indicating an abnormality of the blower 10.

Thus, by monitoring the inlet gas temperature of the blower 10 and the temperature of the blower casing 12, an abnormality in the cooling mechanism can be detected at an early stage and the laser oscillation can be stopped before the damage spreads; also, the operator can easily recognize the portion at which the abnormality has occurred.

In the above embodiment, an abnormal increase in the rotation of the blower 10 is detected by measuring the temperature of the casing 12, but this may be also detected by measuring the temperature of the inlet portion of the cooling unit 13. Furthermore, although the above description exemplifies thermocouples as the means for measuring temperatures, a heat measuring instrument having a simple arrangement, such as a thermostat, may be used instead.

As described above, according to the present invention, an abnormal state of the cooling mechanism, including an abnormal increase in the rotation of the blower, can be detected at an early stage, whereby secondary damage resulting from the abnormality of the cooling mechanism, such as interference between the rotors and the casing of the blower, etc., can be prevented. Accordingly, even if an abnormal state occurs, only minimum repair work is needed to restore the NC laser device to a normal operating state, and therefore, the reliability thereof is improved.

Moreover, the operator is able to quickly recognize the cause of the stoppage of the laser oscillation, whereby maintenance is facilitated.

I claim:

1. An NC laser device which is a combination of a gas laser oscillator provided with a cooling mechanism for forcibly cooling a laser gas by a blower and a cooling unit, and a numerical control device comprising:
   gas temperature measuring means for measuring a gas temperature at an inlet of the blower;
   casing temperature measuring means for measuring a temperature of a casing of the blower; and
   abnormality detecting means for detecting that the cooling mechanism is in an abnormal state, and stopping an operation of the gas laser oscillator, when the inlet gas temperature becomes higher than a predetermined gas temperature reference value or when the casing temperature becomes higher than a predetermined casing temperature reference value.

2. An NC laser device according to claim 1, wherein said abnormality detecting means displays a message indicating an abnormal state of the cooling mechanism at a display device when the inlet gas temperature becomes higher than said gas temperature reference value.

3. An NC laser device according to claim 1, wherein said abnormality detecting means displays a message indicating an abnormal state of the blower at a display device when the inlet gas temperature is higher than said gas temperature reference value and the casing temperature is higher than said casing temperature reference value.

4. An NC laser device according to claim 1, wherein said gas temperature measuring means and said casing temperature measuring means each comprise a thermocouple.

5. An NC laser device according to claim 1, wherein said gas temperature measuring means and said casing temperature measuring means each comprise a thermostat.

6. An NC laser device according to claim 1, wherein said abnormality detecting means displays a message indicating an abnormal state of the blower at a display device when the casing temperature is higher than said casing temperature reference value.

7. An NC laser device as recited in claim 1, wherein the cooling mechanism comprises first and second cooling units connected to the inlet and an outlet of the blower, respectively, and wherein the casing temperature measuring means is positioned between the blower and the second cooling unit.

8. An NC laser device which is a combination of a gas laser oscillator provided with a cooling mechanism for forcibly cooling a laser gas by a blower and a cooling unit, and a numerical control device, comprising:

gas temperature measuring means for measuring a gas temperature at an inlet of the blower; and abnormality detecting means for detecting that the cooling mechanism is in an abnormal state, and stopping an operation of the gas laser oscillator, when the inlet gas temperature becomes higher than a predetermined gas temperature reference value.

9. An NC laser device which is a combination of a gas laser oscillator provided with a cooling mechanism for forcibly cooling a laser gas by a blower and a cooling unit, and a numerical control device, comprising:

casing temperature measuring means for measuring a temperature of a casing of the blower; and abnormality detecting means for detecting that the cooling mechanism is in an abnormal state, and stopping an operation of the gas laser oscillator, when the casing temperature becomes higher than a predetermined casing temperature reference value.

* * * * *